(No Model.)

T. J. TALLY.
Rotary Plow.

No. 229,200. Patented June 22, 1880.

WITNESSES:
C. Neveux
C. Sedgwick

INVENTOR:
T. J. Tally
BY Munn & Co
ATTORNEYS.

UNITED STATES PATENT OFFICE.

THOMAS J. TALLY, OF ROCKPORT, TEXAS, ASSIGNOR TO HIMSELF AND JOHN J. WELDEN.

ROTARY PLOW.

SPECIFICATION forming part of Letters Patent No. 229,200, dated June 22, 1880.

Application filed April 22, 1880. (No model.)

*To all whom it may concern:*

Be it known that I, THOMAS J. TALLY, of Rockport, Aransas county, Texas, have invented a new and useful Improvement in Rotary Plows, of which the following is a specification.

Figure 1:
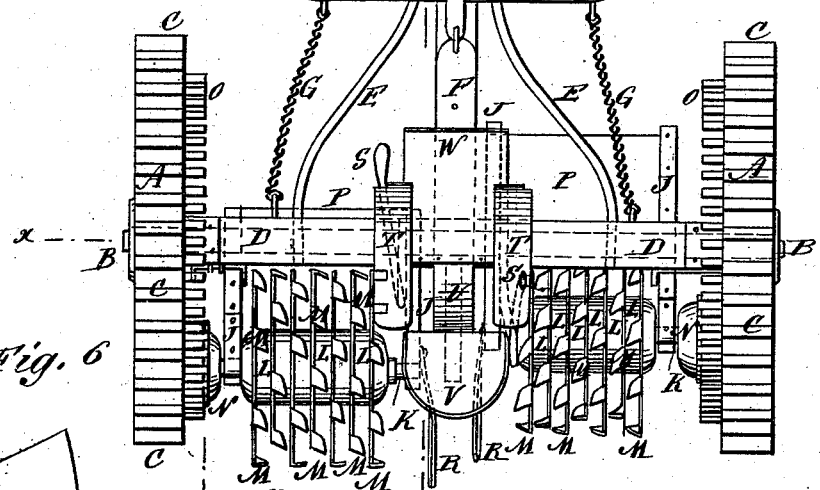
Figure 2:
Figure 2:
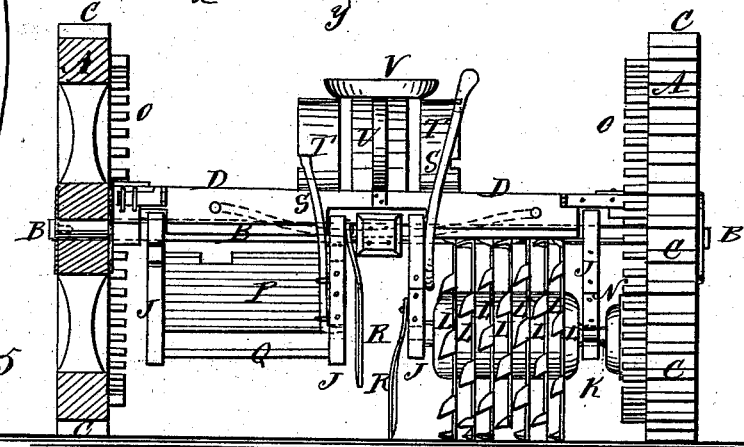
Figure 3:
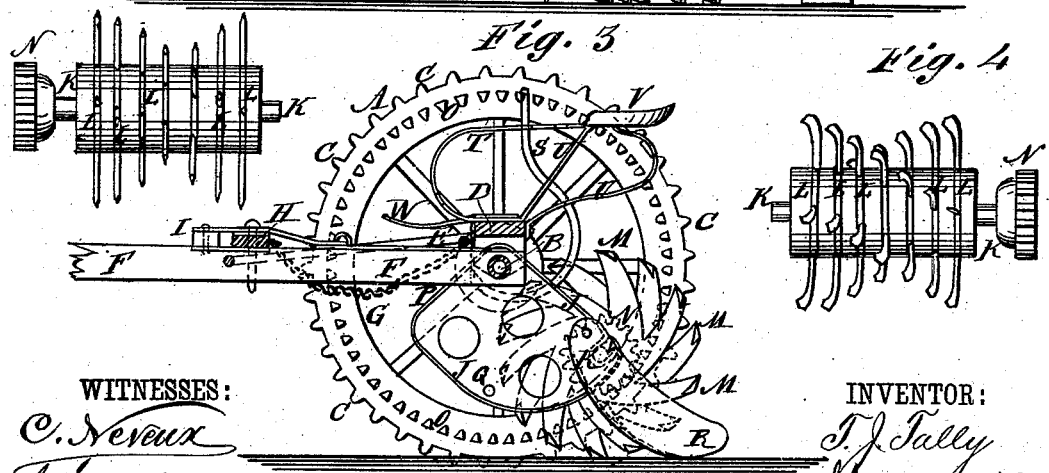
Figure 4:
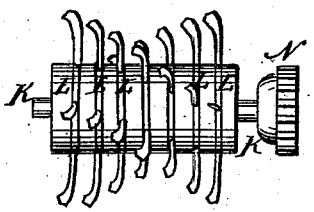

Figure 1 is a plan view of the improvement. Fig. 2 is a rear elevation, partly in section, through the line $x\ x$, Fig. 1, one of the plow-cylinders being removed. Fig. 3 is a sectional side elevation taken through line $y\ y$, Fig. 1. Fig. 4 represents a plow-cylinder provided with cultivator-teeth. Fig. 5 represents a plow-cylinder provided with harrow-teeth, and Fig. 6 is a plan view of one of the plow-plates.

Similar letters of reference indicate corresponding parts.

The object of this invention is to furnish rotary plows for plowing land, preparing the land to receive the seed, and cultivating the plants, which shall be convenient in use, effective in operation, and not liable to get out of order.

A are the drive-wheels, which revolve upon the journals of the axle B, and have cross ribs or cogs C formed upon their faces to prevent them from slipping upon the ground.

To the axle B is attached a cross-beam, D, to the side parts of which are attached the hounds E, that strengthen the tongue F. The rear end of the tongue F is attached to the center of the axle B.

To the cross-beam D are attached the rear ends of the stay-chains G, the forward ends of which are attached to the rear-end parts of the double-tree H. The double-tree H is pivoted to the tongue F, and has single-trees I, attached to its ends in the usual manner.

J are the plates or frames, which are made in quadrantal form, and have holes in their angles to receive the axle B, so that they may hang and turn upon the said axle B. In the rear corners of the plates or frames J are formed bearings to receive the shafts K, that carry the plow-cylinders.

The plow-cylinders are formed of a number of ring plates or washers, L, placed side by side upon the shafts K, and clamping the standards of the plows M between them.

The plates L, the plows M, and the shafts K are secured together by nuts screwed upon the shafts K by bolts or by other suitable means.

The plates of the plows M are made in about the shape shown in Fig. 6, so as to enter the ground readily, and the said plows are arranged spirally upon the cylinder L, so that they may operate upon the ground successively.

When the machine is to be used to prepare the ground to receive seed the plows M are replaced by harrow-teeth, as shown in Fig. 5.

When the machine is to be used for cultivating plants the plows M are replaced by cultivator-teeth, as shown in Fig. 4.

The outer ends of the shafts K project, and to them are attached small gear-wheels N, the teeth of which mesh into the cogs O, attached to the inner sides of the rims of the drive-wheels A, so that the plow-cylinders L may be rotated by the advance of the machine.

The spaces between the cogs O are left open, so that any soil or rubbish that may lodge between the said cogs may be pushed out by the teeth of the gear-wheels N, to prevent the machine from becoming clogged.

To the forward straight edges of the quadrantal plates or frames J are attached guard-boards P, to prevent soil from being thrown forward and upward by the plows. To the plates or frames J, at a little distance from the outer edges of the guard-boards P, are attached guard-rods Q, to bend down grass, weeds, stalks, and other standing rubbish in front of the plows. To the inner quadrantal plates or frames, J, near the outer ends of their rear straight edges, are pivoted the upper ends of plates R, the lower edges of which are curved or made runner-shaped, as shown in Fig. 3. The plates R, when the machine is at work, drag upon the ground, to prevent the plants between the adjacent ends of the two plow-cylinders L from being injured or covered by soil thrown laterally by the plows.

To the forward parts of the inner plates or frames, J, are attached levers S, which are curved upward and forward, so as to pass above the axle B and cross-beam D, and cross the edges of the curved bars T. The lower arms of the bars T are attached to the cross-beam D, and their upper arms project to the rearward. In the edges of the bars T are formed notches to receive the levers S, to lock the plow-cylinders L in place when raised from the ground and when adjusted to work at any desired depth in the ground.

To the cross-beam D, between the catch-bars T, is attached the lower end of the spring standard U, to the upper end of which is attached the driver's seat V.

To the cross-beam D, between the catch-bars T, is also attached a platform or rest, W, for the driver's feet.

Having thus described my invention, I claim as new and desire to secure by Letters Patent—

1. A rotary plow, constructed substantially as herein shown and described, consisting of the drive-wheels A, having cogs O, the axle B, the swinging frames J, having guard-boards P and guard-rods Q, the cylinders L, carrying plows M, and the gear-wheels N, whereby the plow-cylinders are rotated by the advance of the machine, as set forth.

2. In a rotary plow, the combination, with the axle B and the shafts K, carrying the plow-cylinders L, of the swinging quadrantal frames J, having guard-boards P and guard-rods Q, substantially as herein shown and described, whereby the said plow-cylinders are suspended from the said axle, as set forth.

3. In a rotary plow, the combination, with the inner quadrantal frames, J, carrying the plow-cylinders L, of the fenders R, attached to said quadrantal plates and rocking with them upon the axle, substantially as herein shown and described.

THOMAS JACKSON TALLY.

Witnesses:
E. A. PERRINOT,
J. McCLEARMAN.